United States Patent
Li (10) Patent No.: US 11,165,693 B2
(45) Date of Patent: Nov. 2, 2021

(54) PACKET FORWARDING

(71) Applicant: New H3C Technologies Co., Ltd., Zhejiang (CN)

(72) Inventor: Hao Li, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 3 days.

(21) Appl. No.: 16/643,479

(22) PCT Filed: Aug. 29, 2018

(86) PCT No.: PCT/CN2018/102840
§ 371 (c)(1),
(2) Date: Feb. 28, 2020

(87) PCT Pub. No.: WO2019/042303
PCT Pub. Date: Mar. 7, 2019

(65) Prior Publication Data
US 2020/0195551 A1    Jun. 18, 2020

(30) Foreign Application Priority Data

Aug. 29, 2017  (CN) .......................... 201710756807.1

(51) Int. Cl.
*H04L 12/753* (2013.01)
*H04L 12/707* (2013.01)
(Continued)

(52) U.S. Cl.
CPC .............. *H04L 45/48* (2013.01); *H04L 45/02* (2013.01); *H04L 45/22* (2013.01); *H04L 45/72* (2013.01); *H04L 47/125* (2013.01)

(58) Field of Classification Search
CPC ......... H04L 45/48; H04L 45/02; H04L 45/22; H04L 45/72; H04L 47/125; H04L 45/50;
(Continued)

(56) References Cited

U.S. PATENT DOCUMENTS

2015/0288605 A1    10/2015  Yan et al.
2015/0295862 A1*   10/2015  Banerjee ............. H04L 49/3009
                                                              370/392
(Continued)

FOREIGN PATENT DOCUMENTS

| CN | 102739520 A | 10/2012 |
| CN | 103780490 A | 5/2014 |
| CN | 105721312 A | 6/2016 |

OTHER PUBLICATIONS

ISA State Intellectual Property Office of the People's Republic of China, International Search Report Issued in Application No. PCT/CN2018/102840, dated Nov. 22, 2018, WIPO, 4 pages.
(Continued)

*Primary Examiner* — Mohamed A Kamara
(74) *Attorney, Agent, or Firm* — McCoy Russell LLP (57) ABSTRACT

A network segment route and a host route are advertised to a Spine node; the network segment route advertised by the Spine node is learned; when a first packet hits the network segment route, the first packet is sent to a Spine node corresponding to a next hop of the hit network segment routes so that the Spine node sends the first packet to a Leaf node corresponding to a next hop of a host route hit by the first packet.

12 Claims, 3 Drawing Sheets

(51) Int. Cl.
  *H04L 12/751* (2013.01)
  *H04L 12/721* (2013.01)
  *H04L 12/803* (2013.01)

(58) Field of Classification Search
  CPC ..... H04L 49/25; H04L 49/1515; H04L 45/08; H04L 45/44
  See application file for complete search history.

(56) References Cited

U.S. PATENT DOCUMENTS

2017/0279705 A1* 9/2017 Lin .................. H04L 45/72
2018/0139127 A1* 5/2018 Srinivasan ............. H04L 41/12
2019/0394701 A1* 12/2019 Nainar .................. H04W 40/34

OTHER PUBLICATIONS

State Intellectual Property Office of the People's Republic of China, Office Action and Search Report Issued in Application No. 201710756807.1, dated Mar. 14, 2019, 5 pages. (Submitted with Partial Translation).

* cited by examiner

PACKET FORWARDING

CROSS REFERENCE TO RELATED APPLICATIONS

The present application is a U.S. National Phase of International Patent Application Serial No. PCT/CN2018/102840 entitled "PACKET FORWARDING," filed on Aug. 29, 2018. International Patent Application Serial No. PCT/CN2018/102840 claims priority to Chinese Patent Application No. 201710756807.1, filed on Aug. 29, 2017. The entire contents of each of the above-cited applications are hereby incorporated by reference in their entirety for all purposes.

BACKGROUND

A data center has commonly adopted a networking manner of "Spine node plus Leaf node" where the Leaf node is responsible for providing access for a host.

In one way, the data center may use a distributed gateway deployment, that is, each Leaf node in the data center is a distributed gateway. In this case, the Leaf node may provide a layer-2 access, and may also be used as an Internet Protocol (IP) gateway to provide forwarding across network segments. In the distributed gateway deployment, each Leaf node needs to advertise a Medium Access control (MAC) address and an IP address of a host going online at the Leaf node (a physical machine or a virtual machine) as a route to other Leaf nodes, and the other Leaf nodes may receive the route and then store the route in a route entry (in a memory) and distribute the route to respective forwarding planes of the nodes, i.e., a hardware chip.

However, with an increasing scale of a data center, a data center may include up to ten thousand servers and each server may be virtualized into a plurality of virtual machines. For example, if there are 20 thousand servers in the data center and each server is virtualized into 10 virtual machines, there may be 200,000 hosts in the data center, which imposes higher requirements on the scales of a route entry and a hardware entry of a distributed gateway. Take the cost into account, the distributed gateway usually is not a very high-end device, and the scales of the route entry and the hardware entry are limited, and therefore, may be insufficient to carry all routes in a large-scale data center.

DETAILED DESCRIPTION OF THE EMBODIMENTS

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

A data center more and more tends to be deployed in a distributed gateway manner. That is, each Leaf node in the data center is a distributed gateway, and VXLAN (Virtual Extensible LAN) tunnels may be established between distributed gateways based on a standard Ethernet Virtual Private Network (EVPN) protocol so as to synchronize a route of a tenant.

However, with an increasing scale of the data center and the development of virtualization technology, a data center may include up to ten thousand servers, and each server may be virtualized into a plurality of virtual machines. In this case, the number of routes of tenants in the data center may far exceed the scales of a route entry ((in a memory)) and a hardware entry ((in a hardware chip) supportable by a distributed gateway.

One solution is provided to solve a problem that the scale of a hardware entry of a gateway cannot satisfy the requirement of a data center as follows. After receiving a route, a control plane of each distributed gateway may not immediately distribute the route to a forwarding plane thereof, but distribute the route to the forwarding plane according to a destination MAC address or a destination IP address of a flow when the flow arrives. However, this solution can only solve the problem that the scale of the hardware entry of the distributed gateway cannot be matched with the number of routes. Since a distributed gateway still needs to store full routes, a problem that the scale of the route entry of the distributed gateway cannot be matched in size with the number of routes is still unsolved.

The present disclosure provides a solution for forwarding a packet, which solves the current problem by using capability of a Spine node located in a central position in a data center. For convenience of description, the solution of the present disclosure will be described below based on a network of Spine node plus Leaf node.

Figure 1:
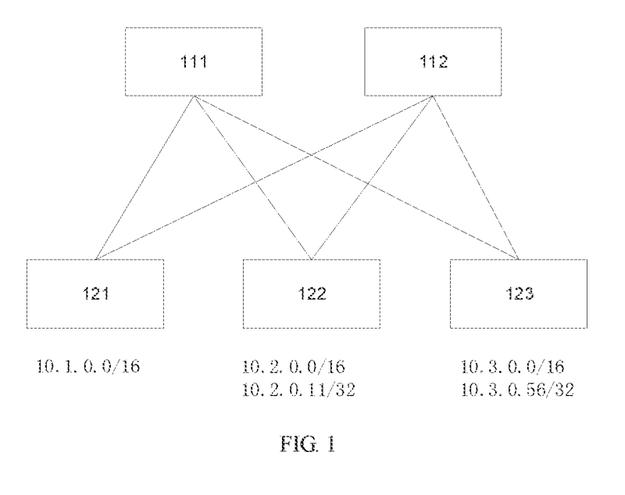
FIG. 1 is a schematic diagram illustrating a network of Spine node plus Leaf node according to an example of the present disclosure.

FIG. 1 illustrates a typical network of Spine node plus Leaf node. The core nodes in the network include two types. One type of core nodes may be Leaf nodes 121, 122 and 123 for providing access for a host and the other type of core nodes may be Spine nodes 111 and 112 for connecting with the Leaf nodes 121, 122, and 123.

In a scenario that the Leaf nodes 121, 122 and 123 are IP gateways, in order to avoid too excessive connections caused by a large number of gateways, a manner of establishing a Border Gateway Protocol (BGP) connection between gateways is usually not adopted. But Spine nodes 111, and 112 are taken as Route Reflectors (RR), and all Leaf nodes 121, 122 and 123 establish BGP connections (establish BGP neighborhood) with the Spine nodes 111 and 112. Thus, each of the Leaf nodes 121, 122 and 123 may advertise a route of a host going online at the leaf node to the Spine nodes 111 and 112, and the Spine nodes 111 and 112 may then advertise the route to other Leaf nodes. In a practical application, since the Spine nodes 111 and 112 commonly use high-end devices, the scales of the route entry and hardware entry of the Spine nodes 111 and 112 may generally support all routes in the data center.

The type of a route may include a network segment route and a host route. The network segment route is a route reaching a network segment. As shown in FIG. 1, the routes with destination IP addresses as 10.1.0.0/16, 10.2.0.0/16 and 10.3.0.0/16 are network segment routes; the host route is a route reaching a specific host. As shown in FIG. 1, the routes with destination IP addresses as 10.2.0.11./32 and 10.3.0.56/32 are host routes.

In a scenario that the Spine nodes 111 and 112 are used as RRs, the Leaf nodes 121, 122 and 123 may advertise a host route of a host going online at the leaf node and a corresponding network segment route together to the Spine nodes 111 and 112, and then, the Spine nodes 111 and 112 may advertise the host route and the network segment route together to other Leaf nodes.

In the present disclosure, to save resources of a route entry and a hardware entry of a Leaf node and impose no impact on normal forwarding of packet, a special route advertising strategy is deployed on the Spine nodes 111 and 112, including that: the Spine nodes 111 and 112 initially advertise only a network segment route to each of the Leaf nodes 121, 122 and 123, and advertise a host route as required. Further, for a network segment not present on each of the Leaf nodes 121, 122 and 123, a next hop of a route corresponding to the network segment points to the Spine nodes 111 and 112. Thus, in a case of a plurality of Spine nodes 111 and 112 being RRs, an equivalent route can be formed to share the load.

As shown in FIG. 1, the network segment routes and the host routes of the Leaf node 122 and the Leaf node 123 will be advertised. However, initially, only the network segment routes 10.2.0.0/16 and 10.3.0.0/16 may be advertised to the Leaf node 121 so as to form an equivalent route on the Leaf node 121. That is to say, a next hop of the equivalent route from the Leaf node 121 to the network segment 10.2.0.0/16 is the Spine node 111 and the Spine node 112, and the next hop of the equivalent route from the Leaf node 121 to the network segment 10.3.0.0/16 is also the Spine node 111 and the Spine node 112.

Based on the above description, a method of the present disclosure will be described below.

Figure 2:
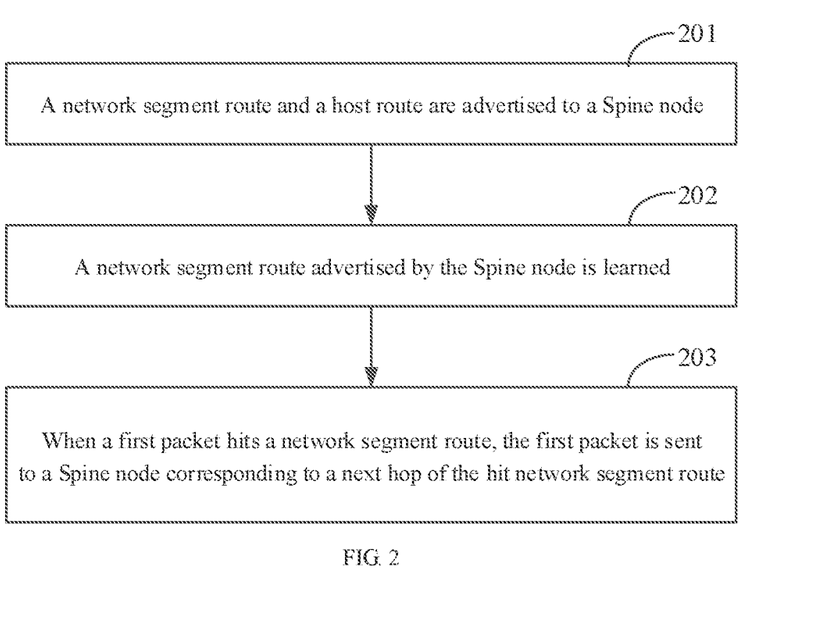
FIG. 2 is a flowchart illustrating a method according to an example of the present disclosure.

As shown in FIG. 2, in an example, a data center may include Spine nodes and Leaf nodes. Any Leaf node may establish BGP neighborhood with each of the Spine nodes, and is an IP gateway (that is, a distributed gateway architecture is adopted in the data center). Thus, any Leaf node may execute the following blocks during operation.

Block 201: the leaf node may advertise a network segment route and a host route to a Spine node.

Block 202: the leaf node may learn a network segment route advertised by the Spine node.

Block 203: when a first packet hits a network segment route learned by the leaf node, the leaf node may send the first packet to a Spine node corresponding to a next hop of the hit network segment route, so that the Spine node sends the first packet to a Leaf node corresponding to a next hop of a host route hit by the first packet.

It may be seen from block 201 to block 203 that a Spine node in the present disclosure may learn a network segment route and a host route simultaneously, and a Leaf node may first learn a network segment route from a Spine node and send a packet to the Spine node through the network segment route and the Spine node finally sends the packet based on a host route. In such a way, a Leaf node may implement packet forwarding without learning a host route from a Spine node. Since the number of network segment routes in a data center is far less than the number of host routes, the capabilities of a route entry and a hardware entry on a Leaf node can satisfy a small number of network segment routes in the data center, thereby solving a problem that the scales of route entry and hardware entry on the Leaf node are limited.

Figure 3:
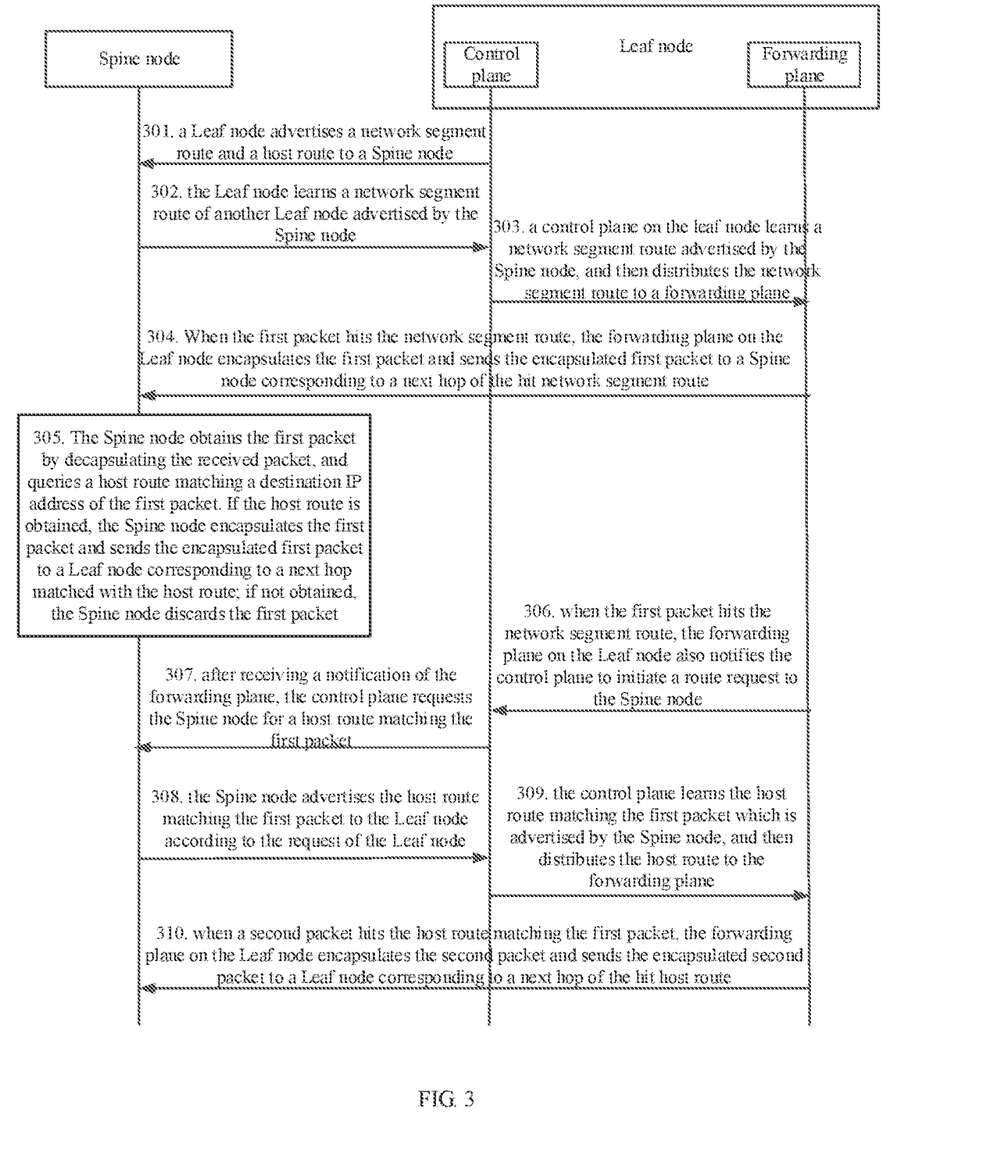
FIG. 3 is a flowchart illustrating an interaction between a Spine node and a Leaf node according to an example of the present disclosure.

With Reference to FIG. 3, a specific implementing process of the present disclosure will be described below through an interaction between a Spine node and a Leaf node. FIG. 3 is a flowchart illustrating an interaction between a Spine node and any Leaf node, which may include the following blocks.

Block 301: a Leaf node advertises a network segment route and a host route to a Spine node.

Here, a next hop of the network segment route and a next hop of the host route advertised to the Spine node by the Leaf node are an IP address of the Leaf node.

Block 302: the Leaf node learns a network segment route of another Leaf node advertised by the Spine node.

The Spine node may modify a next hop of the network segment route to the Spine node when advertising the network segment route, so that the next hop of the network segment route learned from the Spine node by the Leaf node is an IP address of the Spine node.

Block 303: a control plane on the leaf node learns the network segment route advertised by the Spine node, and then distributes the network segment route to a forwarding plane.

Block 304: when a first packet hits the network segment route, the forwarding plane on the Leaf node encapsulates the first packet and sends the encapsulated first packet to a Spine node corresponding to a next hop of the hit network segment route.

In an example, when the next hop of the hit network segment route corresponds to a plurality of Spine nodes, the forwarding plane may send the encapsulated first packet to a Spine node satisfying a preset load sharing strategy.

Here, the first packet encapsulated at block 304 may have two layers of IP headers, where an inner-layer source IP address is a host IP address of a packet sender, an inner-layer destination IP address is a host IP address of a packet receiver, an outer-layer source IP address is an IP address of a source Leaf node (i.e., a Leaf node connected to a packet sender), and an outer-layer destination IP address is an IP address of a Spine node.

Block 305: The Spine node obtains the first packet by decapsulating the received packet, and queries for a host route matching a destination IP address (i.e., a host IP address of a packet receiver) of the first packet. If the host route is obtained, the Spine node encapsulates the first packet and sends the encapsulated first packet to a Leaf node corresponding to a next hop of the host route; if not obtained, the Spine node discards the first packet.

Here, the encapsulated first packet at block 305 also has two layers of IP headers, where an inner-layer source IP address and an inner-layer destination IP address remain unchanged and are still host IP addresses of a packet sender and a packet receiver with a slight difference in that an outer-layer source IP address of the encapsulated first packet is an IP address of the Spine node, and an outer-layer destination IP address is an IP address of a destination Leaf node (i.e., a Leaf node connected to a packet receiver).

Therefore, a hierarchical forwarding process is implemented through the above block 301 to block 305. In this process, since the source Leaf node connected to a packet sender only stores the network segment route and the Spine node stores full routes including the host route and the network segment route, the source Leaf node firstly sends a packet hitting the network segment route to the Spine node, and the Spine node then forwards the packet to the destination Leaf node connected to the packet receiver.

Although resources of a route entry and a hardware entry of a Leaf node may be saved through the above block 301 to block 305, a packet needs to pass through two VXLAN tunnels, i.e., a VXLAN tunnel between a source Leaf node and a Spine node, and a VXLAN tunnel between the Spine node and a destination Leaf node in a forwarding process. Compared to the manner in which the packet directly passes through a VXLAN tunnel between the source Leaf node and the destination Leaf node, the manner in which the packet passes through the two VXLAN tunnels will use the same physical path. However, in some scenarios, to meet the needs of statistics, management and the like, it is desired that the packet may be directly transmitted through the VXLAN tunnel between the Leaf nodes without logically passing through the Spine node.

To transmit a packet directly without going through the Spine node logically, a forwarding plane on the Leaf node may trigger a control plane to request the Spine node for a host route matching the packet to be forwarded while forwarding the packet based on a network segment route. To achieve this, one feasible manner may be that: at the above block 303, the control plane on the Leaf node may add an action attribute to the learned network segment route and distribute the network segment route with the action attribute to the forwarding plane. The action attribute is configured, when the packet hits the network segment route, to instruct the forwarding plane to perform the following operation: notifying the control plane to request the Spine node for a host route matching the packet.

Based on the above addition process by the control plane at block 303, after the above first packet hits the network segment route with the action attribute, the forwarding plane may also perform the following blocks while executing block 304.

Block 306: when the first packet hits the network segment route, the forwarding plane on the Leaf node also notifies the control plane to initiate a route request to the Spine node.

In an example, the forwarding plane may notify the control plane to initiate the route request in two manners including but not limited to:

A first manner: a special mark is added to the first packet hitting the network segment route, and the first packet with the special mark is uploaded to the control plane, where the special mark is used to instruct the control plane not to forward the first packet. Here, the first packet may be uploaded to the control plane via a dedicated packet upload interface.

In the first manner, the special mark is added to the first packet based on two reasons as follows. One reason is to avoid repeated sending of the first packet after the forwarding plane has already forwarded the first packet. The other reason is that since the processing capability of the control plane is limited, errors such as a packet loss will be caused if the control plane is responsible for forwarding the packet.

A second manner: information such as a destination IP address is extracted from the first packet hitting the network segment route, and the extracted information is then sent to the control plane via an interface other than the packet upload interface. Here, the extracted destination IP address is used to instruct the control plane to specifically sense which host route is to be requested from the Spine node.

Block 307: after receiving a notification of the forwarding plane, the control plane on the Leaf node requests the Spine node for a host route matching the first packet.

In an example, the control plane of the Leaf node may request the Spine node for a host route in two manners including but not limited to:

A first manner: the control plane may initiate a route request to the Spine node based on a Transmission Control Protocol (TCP) or a User Datagram Protocol (UDP).

Specifically, in the first manner, a module independent of a routing module may be added on the Leaf node and the Spine node respectively to specifically implement a route request interaction between the Leaf node and the Spine node. The manner is implemented based on a private protocol, and is unrelated to existing routing protocols.

A second manner: the control plane may initiate a route request to the Spine node based on an extended routing protocol.

Since the currently common routing protocols, such as a BGP protocol, generally do not support one device to separately request a route from another device, the second manner requires extension for the routing protocol and then realizes route request interaction by an existing routing module on the Leaf node and Spine node.

Block 308: the Spine node advertises the host route matching the first packet to the Leaf node according to the request of the Leaf node.

Here, the Spine node does not modify a next hop of the host route when advertising the host route, and the next hop of the host route is still an IP address of an original Leaf node.

In an example, when a host route matching the first packet does not exist in the Spine node, the Spine node may distribute a route request prohibition instruction to the Leaf node indicating no host route matching the first packet exists in the Spine node, thereby prevent the Leaf node from frequently initiating a same route request to the Spine node. The Leaf node will not request the Spine node for the host route matching the first packet from within a preset time length after receiving the route request prohibition instruction. It shall be noted that the route request prohibition instruction does not affect the Leaf node to request a host route matching another packet from the Spine node, and the another packet herein refers to a packet with a destination IP address different from the destination IP address of the first packet.

Block 309: the control plane on the Leaf node learns the host route that is matched with the first packet and advertised by the Spine node, and then distributes the host route to the forwarding plane.

Block 310: when a second packet hits the host route matching the first packet, the forwarding plane on the Leaf node encapsulates the second packet and sends the encapsulated second packet to a Leaf node corresponding to a next hop of the hit host route.

In case that the host route and the network segment route both exist on the forwarding plane, a packet may hit the host route first according to the longest matching principle of route. The encapsulated second packet at block 310 has two layers of IP headers, where an inner-layer source IP address is a host IP address of a packet sender, an inner-layer destination IP address is a host IP address of a packet receiver, an outer-layer source IP address is an IP address of a source Leaf node, and an outer-layer destination IP address is an IP address of a destination Leaf node.

In this way, the packet may be directly transmitted from one Leaf node to another Leaf node through the above block 306 to block 310 without logically going through the Spine node. However, seen from the physical path, the packet still passes through the Spine node with a difference from Block 305 in that the encapsulated second packet is directly forwarded by the Spine node once being received without processes of decapsulation, host route query and packet encapsulation.

Through the above block 301 to block 310, when no packets arrive, the Leaf node does not need to learn the host route of another Leaf node, thereby reducing the scale of a route entry and the scale of a hardware entry. When there is a packet arriving, the Leaf node may also obtain a corresponding host route from the Spine node as required, so that the packet can be forwarded through an ideal path; meanwhile, since the Leaf node only stores host routes for flow forwarding, the host routes may not occupy excessive resources of route entries and hardware entries on the Leaf node.

In an example, after the control plane on the Leaf node learns the host route advertised by the Spine node and distributes the host route to the forwarding plane, if no packet hits the host route within a preset time length, the control plane on the Leaf node may age the host route and notify the forwarding plane of the aging of the host route at the same time so as to further reduce the route entries of the Leaf node occupied by the host route, where the forwarding plane ages the host route after receiving a notification from the control plane; in this case, the route entries and the hardware entries consumed by the host route may be released in time. For the network segment route, the aging is not required.

To enable those of ordinary skill in the art to understand more clearly, an implementing process of the present disclosure will be described below in combination with a networking scenario of Spine node plus Leaf node shown in FIG. 1.

In FIG. 1, the Spine node 111 and the Spine node 112 are route reflectors, and the Leaf node 121 to the Leaf node 123 are IP gateways. A network segment route with a destination IP address as 10.2.0.0/16 and a host route with a destination address as 10.2.0.11./32 exist on the Leaf node 122, and a network segment route with a destination IP address as 10.3.0.0/16 and a host route with a destination address as 10.3.0.56./32 exist on the Leaf node 123.

(1) The network segment routes and the host routes on the Leaf node 122 and the Leaf node 123 are all advertised to the Spine node 111 and the Spine node 112. However, initially, the Leaf node 121 may only learn the network segment routes from the Spine node 111 and the Spine node 112. Further, the network segment routes learned by the Leaf node 121 may form equivalent routes on the Leaf node 121, and next hops of the equivalent routes are the Spine node 111 and the Spine node 112 respectively.

(2) On the Leaf node 121, the control plane may add an action attribute to the received network segment routes with the destination IP addresses as 10.2.0.0/16 and 10.3.0.0/16, and then distribute the network segment routes to the forwarding plane. With the action attribute, the forwarding plane can notify the control plane to request the Spine node 111 or the Spine node 112 for a host route matching with a packet to be forwarded while forwarding the packet according to the network segment routes.

(3) When the Leaf node 121 receives the packet with the destination IP address as 10.3.0.56, since only the network segment route with the destination IP address as 10.3.0.0/16 can be matched, the forwarding plane may send the packet to a particular Spine node, for example, the Spine node 111, through a VXLAN tunnel according to a specific load sharing principle.

(4) Since the Spine node 111 stores full routes including a host route and network segment route, the Spine node 111 may obtain a destination gateway as the Leaf node 123 by querying the routes, and send the packet to the Leaf node 123 through the VXLAN tunnel to the Leaf node 123.

Then, the packet is forwarded through a VXLAN tunnel from the Leaf node 121 to the Spine node 111 and a VXLAN tunnel from the Spine node 111 to the Leaf node 123.

(5) When the Leaf node 121 receives the packet with the destination IP address as 10.3.0.56 for the first time, the forwarding plane on the Leaf node 121 may also notify the control plane to request the Spine node 111 for a host route with the destination IP address as 10.3.0.56.

(6) The Spine node 111 may return the host route requested by the Leaf 121 to the Leaf node 121.

(7) After receiving the host route with the destination IP address as 10.3.0.56/32, the control plane on the Leaf node 121 may distribute the host route to the forwarding plane. Subsequently, the Leaf node 121 may send the packet with the destination IP address as 10.3.0.56 through the VXLAN tunnel from the Leaf node 121 to the Leaf node 123.

Figure 4:
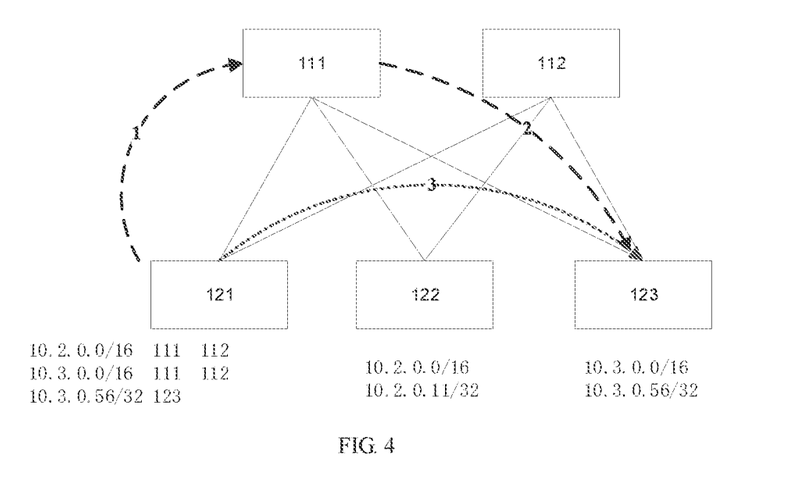
FIG. 4 is a schematic diagram illustrating forwarding a packet before and after distributing a host route according to an example of the present disclosure.

As shown in FIG. 4, after obtaining the host route of 10.3.0.56/32, the Leaf node 121 may send the packet through the VXLAN tunnel from the Leaf node 121 to the Leaf node 123 (as shown by a dotted line 3 in FIG. 4). Before the Leaf node 121 obtains the host route, the packet is to be forwarded through a VXLAN tunnel from the Leaf node 121 to the Spine node 111 and a VXLAN tunnel from the Spine node 111 to the Leaf node 123 (as shown by a dotted line 1 and a dotted line 2 in FIG. 4).

The method of the present disclosure is described above. An apparatus provided in the present disclosure will be described below.

Figure 5:
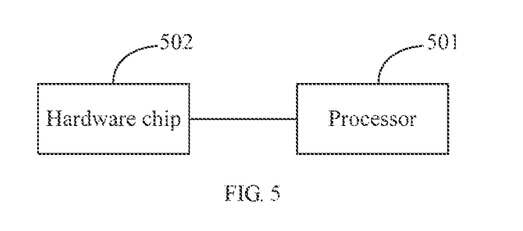
FIG. 5 is a block diagram illustrating a structure of an apparatus according to an example of the present disclosure.

The present disclosure provides a Leaf node device, where the Leaf node device establishes a BGP neighborhood with a Spine node device. As shown in FIG. 5, a hardware environment of the Leaf node device usually includes at least a processor 501 such as a Central Processing Unit (CPU) and a hardware chip 502. Certainly, the Leaf node device may also include other hardware, for example, a memory and so on, for implementing the above operation of the present disclosure by interacting with the processor 501 and the hardware chip 502. The interaction of the above other hardware with the processor 501 and the hardware chip 502 may be performed by adopting a solution in the prior art, as long as the functions of the above processor 501 and the hardware chip 502 can be implemented.

The processor 501 may be configured to implement functions of a control plane on the Leaf node device, and the hardware chip 502 may be configured to implement functions of a forwarding plane on the Leaf node device, which are described in details as follows.

The processor 501 is configured to advertise a network segment route and a host route to a Spine node, learn a network segment route advertised by the Spine node, and distribute the learned network segment route to the hardware chip 502.

The hardware chip 502 is configured to send a first packet to a Spine node corresponding to a next hop of a network segment route hit by the first packet, so that the Spine node sends the first packet to a Leaf node corresponding to a next hop of a host route hit by the first packet.

In one of the examples, the hardware chip 502 is configured to send the first packet to a Spine node satisfying a preset load sharing strategy when the next hop of the hit network segment route corresponds to a plurality of Spine nodes.

In one of the examples, when sending the first packet to the Spine node corresponding to the next hop of the hit network segment route, the hardware chip 502 may also notify the processor 501 to request the Spine node for a host route matching the first packet.

The processor 501 is also configured to request the Spine node for the host route matching the first packet and learn the host route matching the first packet which is advertised by the Spine node after receiving a notification from the hardware chip 502; the processor is also configured to distribute the learned host route matching the first packet to the hardware chip 502.

The hardware chip 502 is also configured to send a second packet to a Leaf node corresponding to a next hop of the host route matching the first packet when the second packet hits the host route.

In one of the examples, the processor 501 is also configured to distribute the learned network segment route to the hardware chip 502 by a way of adding an action attribute to the learned network segment route and distributing the network segment route containing the action attribute to the hardware chip 502.

The hardware chip 502 is also configured to request the Spine node for a host route matching the first packet according to the action attribute contained in the network segment route when sending the first packet to the Spine node corresponding to the next hop of the hit network segment route.

In one of the examples, the processor 501 is also configured to age the host route matching the first packet and notify the hardware chip 502 of the aging of the host route when no packet hits the host route within a preset time length from learning the host route.

The hardware chip 502 is also configured to age the host route after receiving a notification from the processor 501.

In one of the examples, after requesting the Spine node for the host route matching the first packet, the processor 501 is also configured to receive a route request prohibition instruction from the Spine node, where the route request prohibition instruction indicates no host route matching the first packet exists; the processor is prohibited from requesting the Spine node for the host route matching the first packet within a preset time length.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of forwarding a packet, wherein, the method is applied to any Leaf node in a data center comprising Leaf nodes for providing access for hosts and Spine nodes for connecting with the Leaf nodes, the any Leaf node establishing a Border Gateway Protocol (BGP) neighborhood with each of the Spine nodes, and the method comprises:
  advertising a network segment route and a host route of the any Leaf node to the Spine node;
  learning at least one network segment route of at least one other Leaf node in the data center, which is advertised by the Spine node without learning at least one host route of the at least one other Leaf node; and
  when a first packet hits a network segment route of one of the at least one other Leaf node, sending the first packet to a Spine node corresponding to a next hop of a hit network segment route, so that the Spine node sends the first packet to a Leaf node corresponding to a next hop of a host route hit by the first packet.

2. The method according to claim 1, wherein sending the first packet to the Spine node corresponding to the next hop of the hit network segment route comprises:
  when the next hop of the hit network segment route corresponds to a plurality of Spine nodes, sending the first packet to a Spine node satisfying a preset load sharing strategy.

3. The method according to claim 1, wherein when sending the first packet to the Spine node corresponding to the next hop of the hit network segment route, the method also comprises:
  requesting the Spine node for a host route matching the first packet;
  learning the host route matching the first packet which is advertised by the Spine node; and
  when a second packet hits the host route matching the first packet, sending the second packet to a Leaf node corresponding to a next hop of the host route.

4. The method according to claim 3, wherein requesting the Spine node for the host route matching the first packet comprises:
  when the first packet is sent to the Spine node corresponding to the next hop of the hit network segment route, requesting the Spine node for a host route matching the first packet based on an action attribute contained in the hit network segment route.

5. The method according to claim 3, wherein
  when no packet hits the host route matching the first packet within a preset time length, the host route is aged.

6. The method according to claim 3, wherein after requesting the Spine node for the host route matching the first packet, the method also comprises:
  receiving a route request prohibition instruction from the Spine node, wherein the route request prohibition instruction indicates that no host route matching the first packet exists; and
  prohibiting requesting the Spine node for the host route matching the first packet within a preset time length.

7. A Leaf node device, comprising:
  a Central Processing Unit (CPU) and a hardware chip, wherein,
    the processor is configured to: advertise a network segment route and a host route of said Leaf node to a Spine node in a data center comprising Leaf nodes for providing access for hosts and Spine nodes for connecting with the Leaf nodes;

learn at least one network segment route of at least one other Leaf node in the data center, which is advertised by the Spine node without learning at least one host route of the at least one other Leaf node; and distribute the learned network segment route to the hardware chip; wherein the hardware chip is configured to send a first packet to a Spine node corresponding to a next hop of a network segment route of one of the at least one other Leaf node which is hit by the first packet, so that the Spine node sends the first packet to a Leaf node corresponding to a next hop of a host route hit by the first packet.

8. The Leaf node device according to claim 7, wherein the hardware chip is configured to send the first packet to a Spine node satisfying a preset load sharing strategy when the next hop of a hit network segment route corresponds to a plurality of Spine nodes.

9. The Leaf node device according to claim 7, wherein the hardware chip is also configured to, when sending the first packet to the Spine node corresponding to the next hop of the hit network segment route, notify the processor to request the Spine node for a host route matching the first packet;

the processor is also configured to request the Spine node for the host route matching the first packet and learn the host route matching the first packet which is advertised by the Spine node after receiving the notification from the hardware chip; and the processor is also configured to distribute the learned host route matching the first packet to the hardware chip; wherein the hardware chip is also configured to send a second packet to a Leaf node corresponding to a next hop of the host route matching the first packet when the second packet hits the host route.

10. The Leaf node device according to claim 9, wherein the processor is configured to: when the learned network segment route is distributed to the hardware chip, add an action attribute to the learned network segment route and distribute the learned network segment route with the action attribute to the hardware chip; wherein the hardware chip is also configured to, when the first packet is sent to the Spine node corresponding to the next hop of the hit network segment route, notify the processor to request the Spine node for a host route matching the first packet based on the action attribute contained in the hit network segment route.

11. The Leaf node device according to claim 9, wherein the processor is also configured to age the host route matching the first packet and notify the hardware chip of the aging of the host route when no packet hits the host route within a preset time length; wherein the hardware chip is also configured to age the host route after receiving the notification from the processor.

12. The Leaf node device according to claim 9, wherein, the processor is also configured to, after requesting the Spine node for the host route matching the first packet, receive a route request prohibition instruction from the Spine node, wherein the route request prohibition instruction indicates no host route matching the first packet exists;

the processor is also configured to prohibit requesting the Spine node for the host route matching the first packet within a preset time length.

* * * * *